United States Patent [19]

McCullough

[11] Patent Number: 5,821,012
[45] Date of Patent: Oct. 13, 1998

[54] SECONDARY ENERGY STORAGE DEVICE AND ELECTRODE EMPLOYING A MULTIPLICITY OF FLEXIBLE BIREGIONAL FIBERS

[76] Inventor: Francis Patrick McCullough, 1807 Veranda, West Columbia, Tex. 77515

[21] Appl. No.: 674,124

[22] Filed: Jul. 1, 1996

Related U.S. Application Data

[63] Continuation-in-part of Ser. No. 428,691, Apr. 25, 1995, Pat. No. 5,700,573.

[51] Int. Cl.$^6$ ...................................................... H01M 4/60
[52] U.S. Cl. ...................... 429/209; 429/218; 423/447.2; 428/367
[58] Field of Search ..................................... 429/209, 218, 429/223, 224, 249, 251, 212; 423/447.2, 447.1; 428/113, 224, 253, 288, 364, 367

[56] References Cited

U.S. PATENT DOCUMENTS

| | | | |
|---|---|---|---|
| 3,844,837 | 10/1974 | Bennion et al. | 136/6 |
| 4,631,118 | 12/1986 | McCullough et al. | 204/16 |
| 4,643,931 | 2/1987 | McCullogh et al. | 429/194 |
| 4,830,938 | 5/1989 | McCullough et al. | 429/149 |
| 4,837,076 | 6/1989 | McCullough et al. | 428/224 |
| 4,865,931 | 9/1989 | McCullough et al. | 429/194 |
| 4,877,695 | 10/1989 | Cipriano et al. | 429/102 |
| 4,886,715 | 12/1989 | McCullough et al. | 429/103 |
| 4,929,521 | 5/1990 | Cipriano et al. | 429/102 |
| 4,952,466 | 8/1990 | Cipriano et al. | 428/284 |
| 5,260,124 | 11/1993 | Gaier | 428/257 |
| 5,518,836 | 5/1996 | McCullough | 429/94 |
| 5,532,083 | 7/1996 | McCullough | 429/210 |

OTHER PUBLICATIONS

High Performance Fibers II, Battelle 1987, pp. 149–159 No month.
Man Made Fiber & Textile Dictionary, Celanese Corp. pp. 17, 33 and 123 No date.
Encyclopedia of Polymer Science and Engineering vol. 2, 1958, pp. 641–659 No date.
Modern Textiles, 2nd Ed. 1982, by D.S. Lyle, Wiley & Sons, pp. 41–63 No date.

*Primary Examiner*—Anthony Skapars
*Attorney, Agent, or Firm*—Nis H. Juhl

[57] ABSTRACT

An electrode is disclosed comprising a multiplicity of flexible biregional fibers, each fiber having an inner core region of a thermoplastic polymeric composition and a surrounding outer region of an electrically conductive carbonaceous sheath. The biregional fiber is derived from a biregional precursor fiber having an inner core region of a thermoplastic polymeric composition and a surrounding outer region of an oxidation stabilized sheath, and wherein the biregional precursor fiber is derived from a polymeric fiber comprising a single homogeneous polymeric composition, the flexible biregional fiber is particularly characterized by having a ratio of the radius of the core region with respect to the total radius of the fiber (r:R) of from about 1:4 to about 1:1.05 and a breaking twist angle of from about 4 to about 13 degrees. Also disclosed are secondary electrical storage devices employing electrodes of the invention.

19 Claims, 3 Drawing Sheets

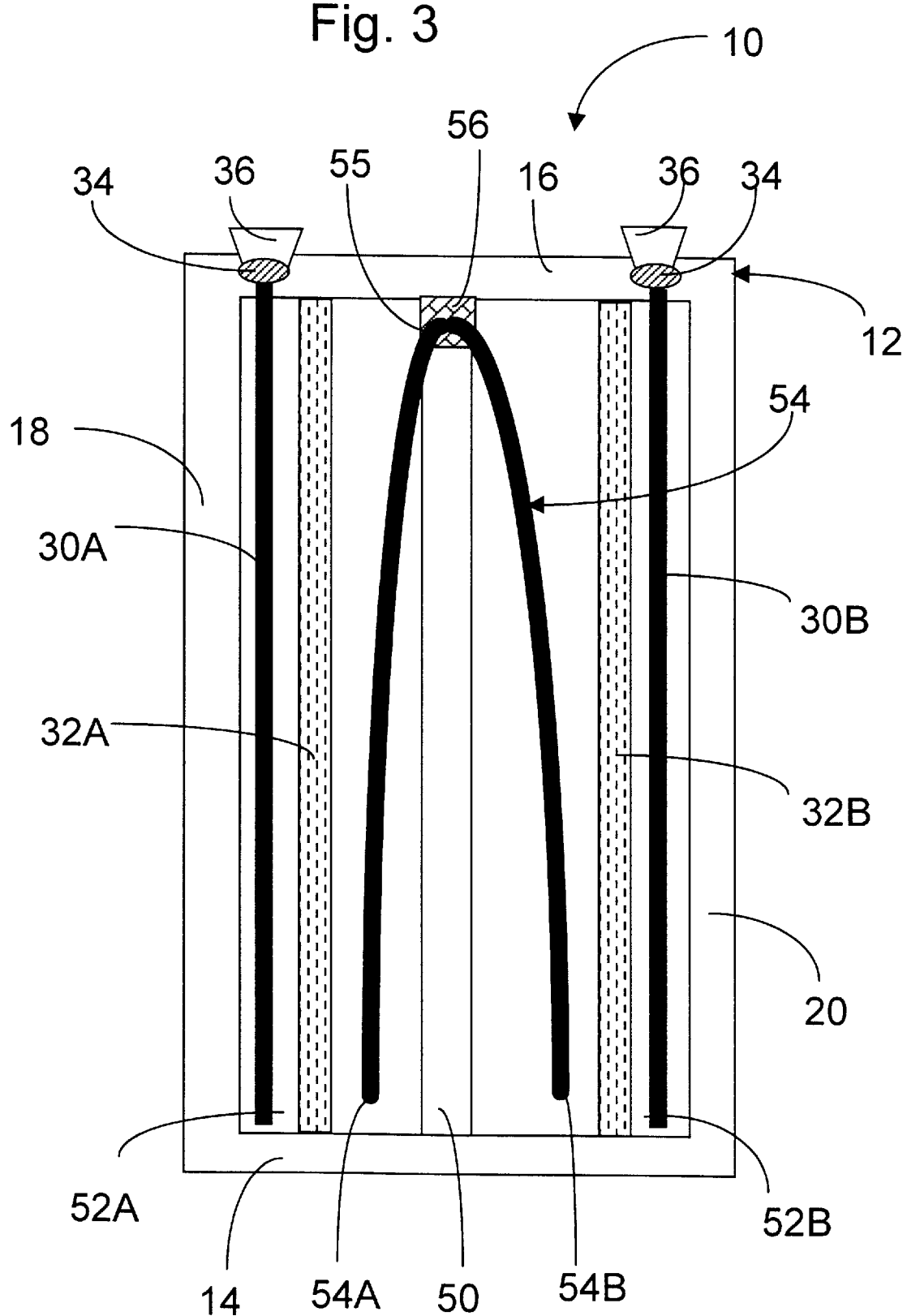

SECONDARY ENERGY STORAGE DEVICE AND ELECTRODE EMPLOYING A MULTIPLICITY OF FLEXIBLE BIREGIONAL FIBERS

CROSS REFERENCE TO RELATED APPLICATION

This application is a continuation in part of my application Ser. No. 08/428,691, filed Apr. 25, 1995, now U.S. Pat. No. 5,700,573, entitled Flexible Biregional Carbonaceous Fiber, Articles Made from Flexible Biregional Carbonaceous Fibers, and Method of Manufacture.

FIELD OF THE INVENTION

The present invention relates to an electrode for a secondary energy storage device, comprising a multiplicity of electrically conductive biregional fibers (BRF) having an inner region of a thermoplastic polymeric core and an outer region of a carbonaceous sheath. The invention also relates to a secondary energy storage device employing at least one electrode comprised of a multiplicity of said biregional fibers.

The biregional fiber is derived from a biregional precursor fiber (BRPF) which also has an inner region of a thermoplastic polymeric core and an outer sheath, except that the outer sheath comprises a stabilized thermoplastic polymeric material. In both of the biregional and the biregional precursor fibers, the ratio (r:R) of the radius of the core region (r) with respect to the total radius (R) of the biregional fiber is from about 1:4 to about 1:1.05, preferably from about 1:3 to about 1:1.12. The electrically conductive biregional fibers of the invention lack the brittleness normally associated with carbon and graphitic fibers of the prior art and have a breaking twist angle of from about 4 degrees up to about 13 degrees.

BACKGROUND OF THE INVENTION

Resilient and flexible, linear and non-linear carbonaceous fibers are now well known in the art. Representative of non-linear carbonaceous fibers is U.S. Pat. No. 4,837,076, issued Jun. 6, 1989 to McCullough et al, the subject matter of which is incorporated herein by reference in its entirety. The fibers are produced by melt or wet spinning fibers from a thermoplastic polymeric composition and then stabilizing the fibers by treating them in an oxygen containing atmosphere and at an elevated temperature for a predetermined period of time. The oxidation stabilization treatment of the fibers is carried out to the extent such that the entire polymeric material of the fibers, when viewed in cross-section, is oxidized. Although the stabilization process, to some extend, depends on the diameter of the fibers, the composition of the polymeric precursor material, the level of oxygen in the atmosphere, and the treatment temperature, the process is extremely time consuming and costly in order to achieve complete stabilization of the fibers throughout their cross section.

Traditionally, the stabilization treatment of polymeric fibers in air extends over at least several hours, i.e. anywhere from 3 to in excess of 24 hours to completely permeate the fibers with oxygen and to achieve sufficient stabilization of the fibers in preparation for subsequent carbonization of the stabilized fibers to produce carbonaceous fibers for commercial end uses. The Encyclopedia of Polymer Science and Engineering, Vol. 2, A Wiley-Interscience Publication, 1985, pp. 641–659, reports that "current standard processing technology requires from 1 to 2 hours for adequate stabilization" of fibers, p.658. However, this publication does not disclose the length of time that would be required for stabilizing large or "heavy"320K fiber tows (320,000 fibers).

In "High Performance Fibers II, published by Battelle, esp. the chapter entitled "Process Technology—Oxidation/Stabilization", page 149 et seq. it is reported that "the oxidation and stabilization step in processing PAN fibers takes place between 150° C.–300° C. and is the slowest step in the sequence of operations", that "the reaction must take place throughout the fiber and not be confined to the fiber surface.", and "Because the cyclization and oxidation reactions are highly exothermic in nature, the total amount of heat released is so great that temperature control is difficult. Care must be taken to avoid processing too large a number of fibers in close proximity, which would impede heat transfer". Contrary to the teachings in Battelle, it is no longer necessary to fully oxidize the fibers or to keep the number of fibers in a fiber tow below a specified number of less than 40 k , for example. The BRPFs (and BRFs) can now be processed in tows of 320 k fibers.

The lengthy stabilization treatment employed in present standard procedures therefor reduces the productive output of stabilized fibers, requires substantial capital investment, and is extremely costly and a major deterrent in rendering the process desirable for greater commercial exploitation, i.e. extended commercial usage of the fibers at lower cost. It is also reported that if electrically heated oxidation chambers are used, the chambers must be substantially larger than the ovens used in a subsequent carbonization step, therefore resulting in a substantially higher capital cost.

It is further taught in U.S. Pat. No. 4,837,076 that these conventionally stabilized fibers (stabilized precursor fibers) are subsequently formed into a coil-like and/or sinusoidal shape by knitting or weaving a fiber tow into a fabric or cloth. The so formed knitted fabric is thereafter heat treated and carbonized in a relaxed and unstressed condition and in a non-oxidizing atmosphere at a temperature of from about 525° C. to about 750° C. and for a period of time sufficient to produce a heat induced thermoset reaction wherein additional crosslinking and/or cross chain cyclization occurs between the original polymer chains. The carbonization treatment of the fibers is carried out to the extent such that the entire polymeric material of the fiber, when viewed in cross section is carbonized. In example 1 of the patent, it is reported that portions of a stabilized knitted cloth were heat set at temperatures ranging from 550° C. to 950° C. over a 6 hour period. It is further reported that the most flexible fibers and fibers that are subject to the least fiber breakage due to brittleness, when subjected to textile processing, were obtained in those fibers that had been heat treated at a temperature of from about 525° C. to about 750° C. The resulting fiber tows, obtained by deknitting the cloth, and having the heat set, i.e. thermoset, non-linear structural configuration, can then be subjected to other methods of treatment known in the art to create an opening, a procedure in which a yarn or the tow of fibers of the cloth are separated into an entangled, wool-like fluffy material, in which the individual fibers retain their coil-like or sinusoidal configuration, yielding a fluff or batting-like body of considerable loft.

U.S. Pat. No. 5,015,522, issued May 14, 1991 to F. P. McCullough et al, discloses fire resistant multi-component polymeric fibers having one component comprising a fire resistant, non-graphitic carbonaceous material and another component comprising a non-carbonaceous polymeric material. In a particular embodiment, a side by side composite fiber was produced in which one component is entered into another component in the form of a neck so that both components do not separate. Polyacrylonitrile was used as one component and a composition of carbonaceous particles and a polyester was used as the other component. These components were spun through nozzles to provide a sheath-core composite fiber which are disposed toward each other in distinct zones extending throughout the length of the fibers with adjoining surfaces in intimate adhering contact. The carbonaceous material formed the sheath component. The patent does not disclose a biregional fiber that is derived from a single homogeneous polymeric composition which is first stabilized to provide an inner polymeric core region and an outer stabilized sheath and which is then carbonized to provide an outer carbonized sheath.

U.S. Pat. No. 4,837,076, also discloses that at a treatment temperature above 1000° C. the stabilized precursor fibers become graphitic and highly electrically conductive to the point where they begin to approach the conductivity of a metallic conductor. These graphitic fibers find special utility in the manufacture of electrodes for energy storage devices. Since graphitization of the stabilized fibers is carried out at a temperature and for a period of time such that the entire stabilized polymeric material of the fiber, when viewed in cross-section, is graphitized, the process, especially at the higher temperatures, is also extremely time and energy consuming and equipment intensive, and therefor very costly.

Graphitization of oxidation stabilized fibers is generally desired in order to produce higher tensile modulus properties in the fibers. However, it is reported in High Performance Fibers II, published by Battelle, Copyright 1987, esp. the chapter entitled "Process Technology—Graphitization", pages 158 and 159, that "breakage of the fibers is a problem that has not been solved" and that "the most serious disadvantage of these high tensile strength fibers is their low strain-to-failure ratio, which means that they are very brittle". Moreover, the process is also said to be expensive because of the "high capital cost of the equipment and the great amount of electrical energy required to achieve the necessary temperature for graphitization of the fibers (2000° to 3000° C.)", i.e. throughout their entire cross-section.

Various types of fibers are known in the art, including fibers that are generally referred to as "bicomponent or composite fibers", "biconstituent fibers", "bilateral fibers" and "sheath-core fibers". Definitions of these terms can be found in "Man-Made Fiber and Textile Dictionary", Hoechst Celanese Corporation, 1990, pp. 14, 15, 32, and 139. A bicomponent or composite fiber is defined as a fiber composed of two or more polymer types in a sheath-core or side by side (bilateral) relationship. Biconstituent fibers are defined as fibers that are extruded from a homogeneous mixture of two different polymers wherein such fibers combine the characteristics of the two polymers into a single fiber. Bilateral fibers are two generic fibers or variants of the same generic fiber extruded in a side by relationship. Sheath-core fibers are bicomponent fibers of either two polymer types or two variants of the same polymer. One polymer forms a core and the other polymer of a different composition surrounds it as a sheath.

Bicomponent fibers are also disclosed in U.S. Pat. No. 4,643,931, issued Feb. 17, 1987 to F. P. McCullough et al. These fibers are blends of a small amount of conductive fibers into a yarn to act as an electrostatic dissipation element. Fiber manufacturers also routinely manufacture conductive fibers by incorporating into a hollow fiber a core of carbon or graphite containing thermoplastic composite or by coating a fiber with a sheath made of a thermoplastic composite containing carbon or graphite. None of the above types of fibers are comparable to the biregional fibers employed in the present invention.

U.S. Pat. No. 5,260,124, issued Nov. 9, 1993 to J. R. Gaier, discloses a hybrid material comprising a fabric of high strength carbon or graphite fibers, a layer of a graphitized carbon disposed on the fibers, and an intercalate in the layer. In the process of manufacture, Gaier's fabric of high strength carbon or graphitic fibers is coated by vapor deposition with a porous graphite layer to form a two-dimensional fabric like structure. In contrast to Gaier, the fibers of the invention are "biregional" and are not carbonized or graphitized throughout to form a high strength fiber, nor are the biregional fibers of the invention coated with a layer of graphitized carbon, thereby forming a composite structure. The core region of the fiber of the invention always remains thermoplastic, while the sheath region of the fiber is carbonaceous and thermoset. Moreover, the biregional fiber of the invention does not require an intercalate treatment in the outer graphite layer.

Electrical energy storage devices, particularly batteries, which employ fibrous carbon or graphite electrodes and which operate in a nonaqueous electrolyte at ambient temperature are known from U.S. Pat. No. 4,865,931, issued Sept. 12, 1989 to F. P. McCullough et al. The patent generally discloses a secondary battery comprising a housing having at least one cell positioned in the housing, each cell comprising a pair of electrodes made of a multiplicity of electrically conductive carbon fibers, a foraminous electrode separator for electrically insulating the electrodes from contact with each other, and an electrolyte comprising an ionizable salt in a nonaqueous fluid in each cell.

A similar electrical storage device is disclosed in U.S. Pat. No. 4,830,938 to F. P. McCullough et al, issued May 16, 1989. This patent discloses a shared bipolar, carbonaceous fibrous, electrode which is capable of carrying a current from one cell to an adjacent cell without a current collector frame associated therewith. Neither of the aforementioned McCullough et al patents disclose electrodes employing the use of biregional fibers having an inner core region of a thermoplastic polymeric composition and a surrounding outer sheath region of a thermoset carbonaceous material. The biregional fibers are particularly suitable for use as novel electrodes in secondary energy storage devices primarily in view of their substantially greater flexibility and lower cost.

In general, the biregional fibers distinguish over the various types of fibers of the prior art in that the biregional fiber is derived from a homogeneous polymeric composition, i.e. a single polymeric composition, preferably, a standard acrylic polymer, i.e. a copolymer and terpolymer of acrylonitrile, wherein the copolymer and terpolymer contains at least 85 mole percent acrylic units and up to 15 mole percent of one or more vinyl monomers copolymerized therewith, or optionally, a subacrylic polymer as hereinafter defined. Following extrusion of the thermoplastic polymeric fiber, an outer region of the polymeric fiber is oxidation stabilized in a stabilization chamber at a temperature of from 150° C. to 300° C. in an oxidizing atmosphere to form a biregional precursor fiber having an inner core of a thermoplastic polymeric composition and a surrounding outer sheath of a stabilized region. The time of oxidation for the BRPFs is substantially reduced to less than 30 min, preferably from 10 to 20 min. The so produced BRPFs will exhibit distinct visually discernible regions of a white translucent inner core of a thermoplastic polymer and a black outer region of an oxidized sheath. Discontinuities between the regions could not be detected.

The biregional precursor fiber is then subjected to a carbonization treatment, at a higher temperature and in a non-oxidizing atmosphere, albeit for a substantially shorter period of time than a standard carbonization treatment, to convert said biregional precursor fiber to a biregional fiber which still has an inner core of said thermoplastic polymeric composition, but in which the surrounding outer region has been carbonized to form an electrically conductive carbonaceous outer sheath. The time of carbonization for the BRPF is, however, substantially reduced from as much as 30 min., as taught in U.S. Pat. No. 4,837,076, to less than about 3 min., preferably from about 15 sec. to 3 min., depending on various factors such as diameter of the fibers, the degree of carbonization desired, the depth of carbonization, i.e. the thickness of the carbonaceous outer sheath, etc. Prior to carbonization, the BRPF can be crimped and then conducted through the carbonization furnace while in a relaxed and unstressed condition so that the fibers will retain their crimped configuration. The biregional fibers (BRF) also exhibit two visually distinct regions, when viewed in cross section, i.e. a white, translucent inner region (the thermoplastic composition of the core) and an outer black region (the carbonaceous outer sheath). Accordingly, in the case of the BRPF, the fiber comprises a thermoplastic inner core and a thermoplastic stabilized outer sheath, while in the case of the BPF, the inner core is still thermoplastic while the outer sheath is thermoset and carbonized.

When the biregional fiber of the invention is manufactured from a homogeneous polymeric composition, preferably an acrylic polymer, there is no boundary or discontinuity between the inner core and the outer oxidation stabilized or carbonized sheath. The term "homogeneous polymeric composition" used herein includes homopolymers, copolymers and terpolymers" and does not include fibers containing two or more polymers of different compositions and coefficients of crystallinity. In contrast discontinuities are produced in bilayered or bicomponent fibers in which two polymers of different compositions are used in a side by side or core-sheath relationship Such discontinuities or boundaries occur between the layers of the different polymeric compositions due to their different coefficients of crystallinity. This also applies to different polymeric compositions which are intermixed with each other.

In the case of a core/sheath fiber, the outer sheath layer is formed much like a skin layer and is separate and distinct from the inner core thus forming a physical boundary or discontinuity between the inner core and the outer skin layer. More specifically, in viewing a cross sectional surface of a bilayered or sheath-core fiber (generally coextruded), inspection of the surface from an outer periphery to the center of the fiber surface, one would pass from one type of polymeric composition forming the outer sheath layer through a boundary layer or discontinuity into the core having another polymeric composition of different crystallinity. As previously indicated, polymers having different compositions also have different coefficients of crystallinity and melting points. For example, polyacrylonitrile will undergo a melting point transition at a temperature range of 320° C.–330° C. This represents a relatively high melting point for polymers and is characteristic of stiff chains. Both nylon 6,6 and PET fibers melt at 265° C., and polyolefins such as polyethylene and polypropylene melt around 135° C. and 165° C., respectively. Accordingly, although the inner core and the outer sheath of the biregional fiber of the invention forms two visually distinct regions, when viewed in cross section, they do not form a physical boundary or discontinuity between the core and the sheath, i.e. the regions are continuous.

DEFINITIONS

The term "biregional fiber" or "BRF" are interchangeably used herein and apply to a fiber that is produced from a biregional precursor fiber and that comprises an inner core region of a thermoplastic polymeric composition and a surrounding outer sheath region of an electrically conductive carbonaceous material. The term BRF includes those fibers that have a graphitic outer sheath BRF-B and that are highly electrically conductive.

The terms "biregional precursor fiber" or "BRPF" are interchangeably used herein and apply to a fiber which is derived from a single homogeneous polymeric composition fiber, preferably an acrylic composition. However, it is also intended to be within the scope of the invention to include mixtures comprising a homogeneous polymeric composition having inert submicron particles, or the like, distributed throughout the composition. The BRPF comprises an inner core region of a thermoplastic polymeric composition and a surrounding outer sheath region of a stabilized thermoplastic composition.

The term "homogeneous" when applied to "a homogeneous polymeric composition", refers to a composition which is uniformly the same, i.e. a composition that is made up of a single polymeric composition having a single coefficient of crystallinity and melting point.

The term "carbonaceous sheath region" used herein applies to the outer carbonaceous sheath of a BRF which is produced by the carbonization of at least a portion of the outer stabilized region of a BRPF.

The term "carbonization" used herein applies to the carbonization treatment of a BRPF which is carried out in an inert atmosphere and at an elevated temperature and in which the existing carbon-to-carbon bonds are maintained and new carbon-to-carbon linkages are established while eliminating oxygen, hydrogen and nitrogen from the molecular structure of the outer region and without causing a complete carbonization throughout the cross-section of the fiber The term "Carbon fiber" is known and generally applies to a fiber having a uniform carbon content throughout a cross section of the fiber of greater than 92%, while the term "graphite fiber" or "graphitic fiber" is generally applied to a fiber having a uniform carbon content throughout a cross section of the fiber of greater than 98%.

The term "carbonaceous" used herein applies to the outer electrically conductive, carbonaceous sheath region of the BRF which has been partially or fully carbonized to a carbon content of greater than 85%, preferably greater than 92% and up to graphitization where the carbon content exceeds 98% by weight. The total carbon content of the entire BRF is from 59% to 96%, typically less than 85% and preferably from about 70% to about 85%.

The term "thermoset" used herein applies to polymeric compositions that have undergone a heat induced cross linking reaction of the molecular constituents to irreversibly "set" the polymer. A thermoset polymer has essentially no tendency to melt or soften under carbonization conditions.

The term "Breaking twist angle, $\alpha$" as used herein is as defined in Physical Properties of Textile Fibers by W. E. Morton and J. W. S. Hearle. The Textile Institute, Manchester, England (1975), pages 421–425. To obtain a characteristic property of the fiber material, the breaking-twist angle, 60 is used. If a fiber is twisted far enough, it will eventually break. The breaking point at which this occurs is called the "breaking twist" The number of turns until rupture is inversely proportional to the fiber diameter. The breaking twist angle is given by the formula: tan $\alpha = \pi d \tau_b$, rb where d= diameter of the fiber and $\tau_b$= breaking twist in turns per unit length.

A biregional fiber in which the outer region has been thermoset but the inner core continues to be thermoplastic, have thermoplastic properties, and will not break when the fiber is subjected to a breaking twist angle of greater than 17 and as high as 23 degrees. It will be understood that the breaking twist angle varies to a great extent since it is dependent on the depth of stabilization or carbonization of the fiber. By way of example, if the radius of the inner core region (r) of the biregional fiber with respect to the total radius of the fiber (R) is about 1:1.105, i.e. the outer carbonaceous sheath is relatively thin, the breaking twist angle will be substantially higher as compared to a ratio of 1:4 where the carbonized outer sheath is relatively thick, leaving a relatively small, in radius, thermoplastic core. The breaking twist angle for different types of fibers is set forth in Table II following.

The term "flexible" used herein is specifically applicable to BRFs having a bending strain value of from greater than 0.01 to less than 50%. The term "bending strain" as used herein is defined in Physical Properties of Textile Fibers by W. E. Morton and J. W. S. Hearle. The Textile Institute, Manchester, England (1975), pages 407–409. The percent bending strain on a fiber can be determined by the equation S=(r/R)×100 where S is the percent bending strain, r is the effective cross sectional fiber radius and R is the radius of curvature of the bend. That is, if the neutral plane remains in the center of the fiber, the maximum percentage tensile strain, which will be positive on the outside and negative on the inside of the bend, equals (r/R)×100 in a circular cross section of the fiber. It will be understood, that the bending strain value can vary widely, depending on the carbon content of the outer carbonaceous sheath and the radial thickness of the sheath with respect to the core, as determined by the ratio r:R.

The term "shear sensitivity" used herein generally applies to the tendency of a fiber to become fractured along a plane in the cross section of a fiber as a result of forces such as those caused by twisting. In practical terms, when fibers are subjected to certain textile operations such as the drafting operation in a yarn blending process, the drafting rollers exert significant shear on the fibers being drafted. Shear sensitive fibers exhibit extensive damage, if not complete breakage, whereas shear resistant fibers do not exhibit any significant breakage in this process step.

Conversely, the term "shear resistant" is applied to fibers which do not break in significant numbers when exposed to textile process operations such as drafting or twisting which exert significant shear stresses on the fibers being processed.

The term "bulk specific resistivity" used herein generally applies to the effective electrical resistivity of a biregional fiber taking into account the specific resistivity of the composition of each region and the proportion of area represented by each region, i.e., the particular ratio (r:R) as it applies to a fiber with predetermined selected properties.

The terms "ignition resistant" or "non-flammable" used herein generally refers to the property of a specimen which will not sustain combustion in air when subjected to an ignition source (a flame source) at a temperature of 1000 ° C. or greater. Ignition resistance is determined by a LOI test which is also known as the "oxygen index" or "limited oxygen index" (LOI) test. With this procedure the concentration of oxygen in O2/N2 mixtures is determined at which a vertically mounted specimen, when ignited at its upper end, just continues to burn. The size of the specimen is 0.65–0.3 cm wide and has a length from 7 to 15 cm. The LOI value is calculated according to the equation:

$$LOI = \frac{[O_2]}{[O_2 + N_2]} \times 100$$

The term "pseudo bipolar electrode" used herein is applicable to an electrode in which at least a portion of the BRFs are coated with a lithium salt of a metal oxide. Optionally, the BRFs of the electrode can initially be coated with a conductive metal coating such as, for example, nickel, followed by a coating of a lithium salt of a metal oxide or lithiated metal oxide as it is sometimes referred to. The initial metal coating serving the purpose of providing a lower contact resistance and more secure bond for the metal oxide coating to the BRFs.

The term "polymeric composition" used herein include those polymeric materials as defined in Hawley's Condensed Chemical Dictionary, Eleventh Edition, page 938.

The term "aspect ratio" is defined herein as the length to diameter (l/d) ratio of a fiber.

All percentages given herein are in "percent by weight" unless otherwise specified.

SUMMARY OF THE INVENTION

The present invention particularly relates to an electrode employing a multiplicity of BRFs, each fiber having an inner core region of a thermoplastic polymeric composition and a surrounding outer sheath region of an electrically conductive carbonaceous material. The invention also relates to the use of at least one of said electrodes in secondary energy storage devices, esp. Batteries. Typical electrodes and storage devices are disclosed in copending U.S. application Ser. No. 08/280,708, filed Jul. 26, 1994 in the name of F. P. McCullough, the subject matter of which is incorporated herein, in its entirety. Reference is also made to U.S. Pat. No. 5,518,836, in the name of F. P. McCullough, issued May 21, 1996, the subject matter of which is incorporated herein, in its entirety.

The biregional oxidatively stabilized precursor fibers represents a major departure from the present state of the art in that the BRPFs no longer have to be completely oxidatively stabilized throughout their cross section, but that such fibers can now be made into BRPF by limiting the extent of stabilization to an outer region of the fibers such that the length of time that is required to stabilize the fibers is substantially reduced, resulting in a substantial improvement in flexibility and a reduction in the cost of manufacture of the stabilized fibers. Oxidation and cyclization of the outer cross-sectional region of polymeric fibers leading to the formation of the BRPFs generally takes place at a temperature of between 150° C. to 350° C. and for a length of time sufficient (less than 1 hour but typically less than 30 minutes, e.g. from about 10 to 30 min.) to produce an outer sheath of oxidation stabilized thermoplastic polymeric material in each fiber which can be of any desired thickness as defined by the ratio r:R. Stabilization of large fiber tows of 320 k can now be conducted over as short a period of time as 10 to 20 min. It will be understood, that stabilization of a polymeric composition can be accomplished by means other than "oxidation" as, for example, by chemical oxidants applied at lower temperatures. However, chemical oxidants add to the cost of producing stabilized fibers and pose a problem in the disposal of the residual chemicals that remain after the treatment.

The outer stabilized sheath region of the BRPF has a high softening to no softening temperature and is capable of withstanding the higher temperature conditions of carbonization without detrimental affect on the fiber, i.e. carbonization of the fiber does not affect the integrity of the thermoplastic composition of the inner core since it is shielded by the surrounding stabilized outer sheath region. The BRPF essentially differentiates over fully oxidation stabilized fibers (OPF) of the prior art by a substantially higher breaking twist angle which ranges from greater than 17 to about 23 degrees, without exhibiting any shear. In contrast, standard OPF fibers shear at a breaking twist angle of from about 15 to about 17 degrees (see Table II).

Correspondingly, in the carbonization of the BRPFs, it is now no longer necessary to completely carbonize the BRPFs throughout their cross section whereby the time of carbonization is reduced, reducing the time and energy requirements for the manufacture of the BRF while improving key performance characteristics of the fibers when compared to carbon or graphitic fibers, particularly their flexibility as measured by their bending strain value, breaking twist angle, shear resistance and elongatability.

It is not essential that carbonization be carried out to the extent where it is exactly coincident with the extent of stabilization. In other words, carbonization of the BRPF can be somewhat less than the extent of the stabilized outer region or can be somewhat greater than the extent of the stabilized outer region. In the latter case, it has been found that carbonization of the non-stabilized thermoplastic inner core region does not result in a runaway exothermic reaction and does not, in any way, affect the integrity of the finished fiber.

It is therefor a particular object of the invention to provide terminal and/or bipolar electrodes of the invention for secondary energy storage devices, especially batteries, employing the herein described biregional fibers. The invention further relates to different types of batteries employing at least one of said novel electrodes including a lithium ion battery utilizing a pseudo bipolar electrode employing the biregional fibers having a portion thereof coated with a lithium salt of a metal oxide.

Further objects of the invention, not specifically recited herein above, will become apparent from a reading of the detailed description of the invention.

BRIEF DESCRIPTION OF THE DRAWINGS

FIG. 3 illustrates a battery with a pair of terminal cells, each cell having a terminal electrode and a bipolar electrode of the invention employing a multiplicity of flexible BRFs. As shown, the bipolar electrode is shared by the terminal cells such that a portion of the bipolar electrode extends into each of the terminal cells to form a counter electrode with each of the terminal electrodes.

DETAILED DESCRIPTION OF THE INVENTION

Figure 1:
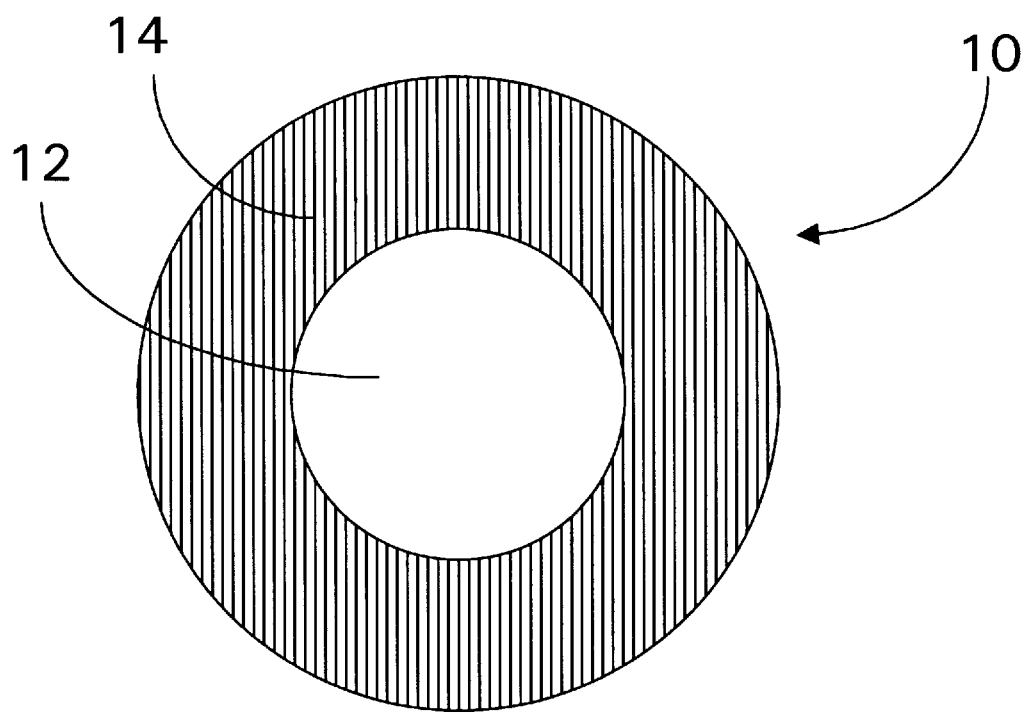
FIG. 1 is a cross sectional view of a generally circular, biregional fiber employed in the novel electrode of the invention.

In the present day manufacture of carbonaceous fibers, stabilization of polymeric fibers is generally conducted in an oxidizing atmosphere and under tension at a moderately elevated temperature of, typically, from about 150° C. up to about 350° C. for PAN (polyacrylonitrile) fibers and for a period of time sufficient to achieve complete permeation of oxygen throughout the fiber. The oxidation stabilized fibers (OPF) are then heat treated in a non-oxidizing atmosphere, usually under tension, at a temperature above about 750° C. to produce a fiber that is carbonized throughout a cross section of the fiber. Fibers that are treated at a temperature above about 1500° C. typically have a carbon content of greater than 92% and are characterized as carbon or graphitic fibers having a high tensile strength. Stabilization of the fibers involves (1) an oxidation cross-linking reaction of adjoining molecular chains as well as (2) a cyclization reaction of pendant nitrate groups to a condensed heterocyclic structure. The reaction mechanism is complex and not readily explainable. It is believed, however, that these two reactions occur concurrently and may be competing. The cyclization reaction is exothermic in nature and must be controlled if the fibrous nature of the acrylic polymer undergoing stabilization is to be preserved.

Because the reactions are highly exothermic in nature, the total amount of heat released is so great that temperature control is difficult. Care must be taken to avoid processing too large a number of fibers in close proximity, which would cause localized heat buildup and impede heat transfer to the atmosphere around the fibers in the fiber assembly (e.g. a fiber tow or a woven or knitted cloth). In fact, the oxidation stabilization of acrylic fibers has a considerable potential for a runaway reaction. Furthermore, some trace of hydrogen cyanide is evolved during this step and the content of this component in the atmosphere of the oven must be prevented from getting into the explosive range by injecting nitrogen, as required. Accordingly, prior art techniques overcome this problem by heating the fibers at a moderate temperature and at a controlled oxygen content over many hours. Control of the oxygen containing atmosphere, e.g. air, can be achieved by diluting the air with nitrogen.

Since thermal stabilization has tended to be unduly time consuming and capital intensive, various other approaches have also been proposed to expedite the desired reaction, e.g., through the use of stabilization promoting agents and/or chemical modification of the acrylic fiber before it can be pyrolized. However, these approaches have also added to the cost of manufacture and further lengthened the time of processing the fibers.

The extent of oxidation stabilization of acrylic fibers can now be substantially reduced by oxidizing only an outer portion or region (when viewed in cross section) of each fiber while the inner portion or core of the fiber remains in a thermoplastic and non-stabilized condition. Achieving stabilization of only an outer region of a fiber can therefor be conducted over a much shorter period of time, depending on the desired thickness of the stabilized outer fiber sheath. Typically, the ratio of the radius of the core with respect to the total radius of the fiber is from about 1:4 to about 1:1.05, preferably from about 1:3 to about 1:1.12. At a ratio of 1:4, it can be calculated that the percentage volume that is represented by the core is about 6% by volume, leaving about 94% for the outer sheath. At a ratio of 1:1.05 the percentage volume that is represented by the core is about 91%, leaving about 9% for the outer sheath. It is generally preferred to keep the ratio at a value where the volume of the outer sheath is relatively small, preferably less than 25%, which represents a ratio of about 1:1.12 to less than 1:1.15 in order to keep the time of oxidation or carbonization treatment at a minimum.

The bending strain value of a BRF varies greatly and depends on the degree of carbonization and on the depth of carbonization of the fiber. Thus, the bending strain value is relatively small when the carbon content of the outer carbonized sheath is greater than 98% and the depth of carbonization (i.e. the ratio r:R) is 1:4, for example. In contrast, the bending strain value is relatively large when the carbon content of the outer carbonized sheath is less than 98% and the depth of carbonization (i.e. the ratio r:R) is 1:1.05, for example.

The BRPFs are heat treated in an inert atmosphere and for a period of time sufficient to form an outer region of a thermoset carbonaceous sheath which, preferably, is of substantially the same thickness as the outer sheath of the stabilized fiber. It will be understood, however, that the processing conditions are difficult to control and maintain to an absolute exact degree such that there is a precise coincidence of carbonization of the oxidation stabilized region only of the fiber. It is not critical, however, that an exact coincidence of the regions is obtained. In other words, the BRPF can be carbonized to the extent that carbonization extends beyond the oxidation stabilized region, i.e. into the thermoplastic core region.

The oxidation stabilization of polymeric fibers can be controlled, i.e. stopped at any point, to produce the two regions which are visually and physically distinct from each other. It is presently taught in the prior art that oxidation stabilization has to be carried out to the extent that the entire fiber material is sufficiently oxidized to stabilize the fiber for subsequent carbonization of the fibers since the thermoplastic composition of the core of a partially stabilized fiber is believed to be highly reactive at temperatures above 200° C. (see High Performance Fibers II, page 151). The expectation by persons skilled in the arts is that carbon or graphitic fibers can not be produced without a complete stabilization of the thermoplastic polymeric fibers prior to their treatment at a higher temperature and in a non-oxidizing atmosphere to achieve carbonization. It is therefor surprising that stabilization of the fibers need not completely include the entire fiber material but that such partial treatment can be carried out without any detriment to the subsequent carbonization process or to the performance of the resulting BRF as an electrode material.

The following Table demonstrates the typical physical and electrical characteristics for various types of fibers including the fibers (BRF and BRPF) that can be usefully employed in the construction of electrodes of the invention:

TABLE I

| Material* | ρ (g/cc) | SR (Ohm-cm) | YM(psi) | Elongation (%) | Strength | TP/TS | Shear Sen. |
|---|---|---|---|---|---|---|---|
| PAN/SAF | 1.15–1.19 | $>10^8$ | low | 8–10 | low | tp | ns |
| OPF | 1.33–1.44 | $>10^8$ | low | 20–30 | low | tp–ts | ns |
| BRPF | 1.20–1.32 | $>10^8$ | low | 15–25 | low | tp–ts | ns |
| CPF 1 | 1.50–1.60 | $10^8$–$10^2$ | 1 MM | 3–9 | low | ts | ss |
| CPF 2 | 1.60–1.70 | $10^2$–$10^{-1}$ | 2–3 MM | 3–6 | low | ts | vss |
| CPF 3 | 1.70–1.95 | $<10^{-1}$ | 3–20 MM | 2–4% | medium | ts | ess |
| BRF 1 | 1.45–1.60 | $10^8$–$10^2$ | <1 MM | 4–12 | low | ts | ns |
| BRF 2 | 1.50–1.70 | $10^3$–$10^0$ | <1–2 MM | 3–9 | low | ts | slight ss |
| BRF 3 | 1.65–1.85 | $<10^0$ | <1–18 MM | 3–7% | medium | ts | slight ss |
| BRF-B | 1.70–1.87 | $<10^2$ | <1–30 MM | 2–5% | high | ts | ss |

Legend
PAN/SAF - Polycrylonitrile/Special Acrylic Fiber
OPF - Oxidized Pan Fiber
BRPF - Biregional Precursor Fiber
CPF - Carbonized PAN Fiber
CPF 1 - noncond. carbonaceous fiber
CPF 2 - antistat carbonaceous fiber
CPF 3 - conductive carbonaceous fiber
BRF - Biregional Fiber
BRF - 3 El. Cond. Carbon Fiber
BRF - B El. Cond. Graphitic Fibers
Shear Sensitivity
ns    non sensitive
ss    sensitive
vss    very sensitive, brittle
ess    extremely sensitive, v. brittle
*All BR fibers can be linear or crimped
TP/TS - Thermoplastic/Thermoset Char.
YM = Young's Modulus
g/cc - grams per cubic cm.

It will be appreciated that the physical characteristics of the BRFs, such as Young's modulus and percent elongation is, to a great extent, dependent on the degree of carbonization of the outer sheath and the extent of carbonization of the fiber per se, i.e. the radial thickness of the carbonized outer region of the filter. If, for example, the outer stabilized and carbonized sheaths of the BRF are at a minimal thickness, the Young's modulus of the BRF approaches that of a polymeric fiber, e.g. a standard acrylic fiber, and will be less than 1 MM psi, typically less than 800,000 psi and can be as low as 300,000 psi.

Broad categories of conventional graphitic fibers are disclosed in "Encyclopedia", in supra, p. 641, and are generally defined as "high strength" and "high modulus" fibers in which the treatment temperatures range from 1000° to 2500° C. These fully graphitized fibers typically are extremely shear sensitive and have a breaking twist angle of from about 1 to about 2 degrees. In contrast to these fully graphitized fibers, the BRF and BRF-B can be carbonized to an extent where the carbonaceous outer sheath of the fiber is still highly electrically conductive and the outer sheath has a carbon content of greater than 85%, preferably greater than 92% to as high as 99% by weight, with the total carbon content of the entire BRF ranging from 59% to 96%, preferably less than 85% and a bulk resistivity of less than about $10^1$ ohm-cm, preferably less than $10^{-2}$ ohm-cm. Although the BRF-Bs are somewhat shear sensitive, they still compare very favorably with conventional carbon or graphite fibers which typically are extremely shear sensitive.

The following Table II demonstrates the typical breaking-twist angles in degrees for various types of fibers:

TABLE II

| Fiber Material | Breaking twist angle α | Reference* |
|---|---|---|
| Polyester | 42–50 | H |
| Acrylic | 33–34.5 | H |
| Glass | 2.5–5 | H |
| Celbond ™ sheath-core polyester binder | 26 | E |
| OPF (Fully stabilized Oxidized PAN Fiber) | 15–17 | E |
| Carbon/Graphite Fiber | 1–2 | E |
| BRPF | 17–3 | E |
| BRF-1 | 9–13 | E |
| BRF-2 | 3–10 | E |
| BRF-El. Cond. sheath | 7–9 | E |
| BRF-B - Graphitic sheath | 4–8 | E |

*Reference Source: "H", Physical Properties ot Textite Fibers by W. E. Morton and J. W. S. Hearfe. The Textile Institute, Manchester, England (1975), p. 425; "E" Experimentafiy measured following the procedure described by Morton & Hearle on p. 421–425 at 65% relative humidity, 1 cm lengths, tensile stress of 10 N/m² and 240 turns per minute It will be noted that electrically conductive BRF-3 and BRF-B exhibit breaking twist angles of from about 7 to about 9 degrees and from about 4 to about 8 degrees, respectively, without breaking. This is a substantial improvement when compared to fully carbonized fibers of the state of the art (carbon or graphitic fibers) which are extremely shear sensitive and which have a breaking twist angle of as low as 1 to 2 degrees.

Polymeric materials that can be suitably used herein to make the biregional fibers of the invention include any of the well known polymers that are capable of being stabilized and carbonized to form the flexible BRFs. Exemplifications of such polymeric materials are copolymers and terpolymers of polyacetylene, polyphenylene, polyvinylidene chloride, and polyacrylonitrile. Other well known polymeric materials include aromatic polyamides (KEVLVAR™), polybenzimide resin, polyvinylidene chloride, and the like. Mesophase pitch (petroleum or coal tar) containing particulate impurities or additives can also suitably be employed. Preferably, the polymeric precursor material is an acrylic or a sub-acrylic polymer (as hereinafter defined).

Acrylic polymers are the materials of choice in preparing the biregional fibers employed in the construction of electrodes of the invention. These polymeric compositions, including sub-acrylic compositions and are disclosed in U.S. application Ser. No. 08/280,708 and in U.S. Pat. No. 5,518,836, in supra. Acrylic polymers are selected from one or more of the following: acrylonitrile based homopolymers, acrylonitrile based copolymers and acrylonitrile based terpolymers. The copolymers typically contain at least about 85 mole percent of acrylonitrile units and up to 15 mole percent of one or more monovinyl units that are copolymerizable with acrylonitrile including, for example, methacrylic acid esters and acrylic acid esters such as methyl methacrylate, ethyl methacrylate, propyl methacrylate, butyl methacrylate, methyl acrylate and ethyl acrylate; vinyl esters such as vinyl acetate and vinyl propionate; acrylic acid, methacrylic acid, maleic acid, itaconic acid and the salts thereof; vinylsulfonic acid and the salts thereof.

A sub-acrylic polymer consists of a long chain polymer selected from the group consisting of copolymers and terpolymers containing less than 85 mole percent acrylic units but more than 15 mole percent of the above mentioned monovinyl units, copolymerized therewith. The amount of a plasticizer that can be present in a sub-acrylic polymer is preferably from greater than 15% to about 25% by weight. However, as much as 35 mole percent of the monovinyl units can be blended with the acrylic units to render the blend more easily melt extrudable through an extrusion nozzle or nozzles while the polymer blend is in a heat softened condition. The so extruded, heat softened filament can be stretched and attenuated, while under tension, to form a finer denier filament (i.e. in which the unit length of the fiber is increased with respect to the weight) having a relatively smaller diameter as compared to extruded fibers made from a standard acrylic resin. The sub-acrylic polymer of the invention can preferably be employed in extruding a filament having a noncircular cross-section.

The plasticizer can be added to or blended with a high polymer to facilitate processing and to increase the flexibility and toughness of the final product by internal modification (solvation) of the polymer molecule. Suitable plasticizers can be any organic compound including, for example, vinyl chloride, methyl acrylate, methyl methacrylate, polyvinyl chloride and cellulose esters, phthalates, adipates, and sebacate esters, polyols such as ethylene glycol and its derivatives, tricresyl phosphate, caster oil, etc.

The physical shape of the polymeric fiber that can be suitably employed in the production of the oxidation stabilized or carbonized biregional fiber of the invention can be of the usual generally circular in cross section fiber, having an aspect ratio of greater than 100:1.

Figure 2:
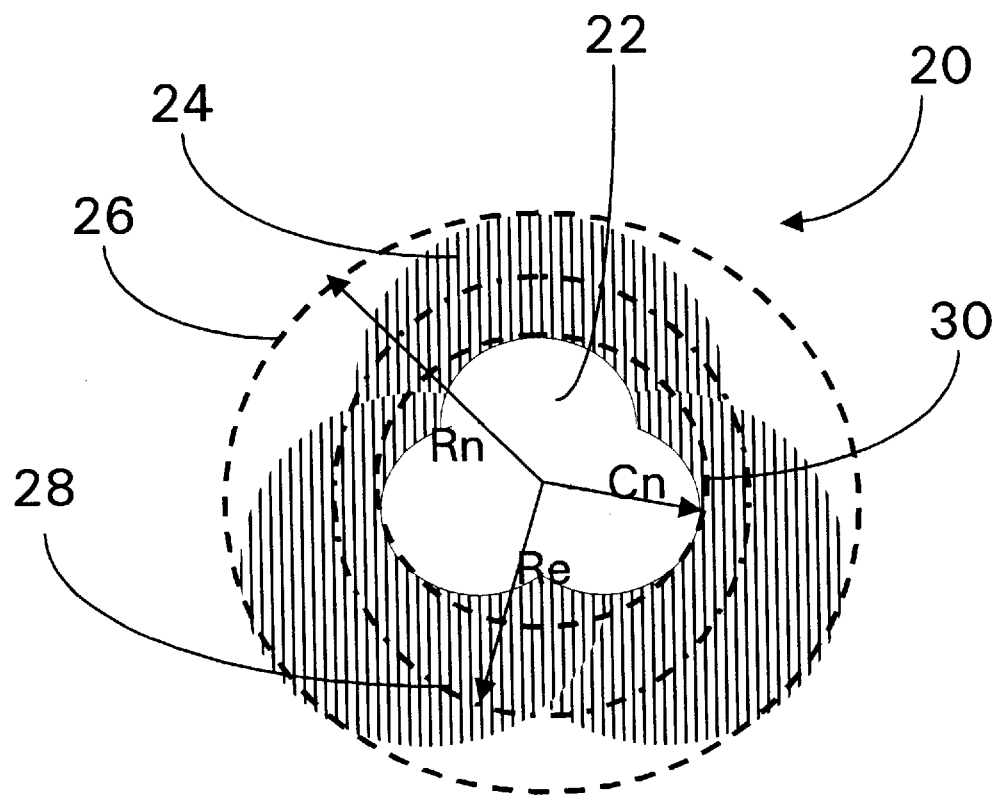
FIG. 2 is a cross sectional view of a preferred trilobal, biregional fiber employed in the novel electrode of the invention.

Preferably, the BRFs have a non-circular cross sectional shape as described and illustrated in FIG. 2 of U.S. Pat. No. 5,518,836, and U.S. application Ser. No. 08/280,708. The non-circular in cross section BRFs employed in the electrodes of the invention preferably are multi-lobal, e.g. tri-lobal or pentalobal, in cross-section.

The BRFs can also be made more easily and at a substantially lower manufacturing cost from an unfiltered polymeric material such as, for example, an acrylic or sub-acrylic polymer that can contain from about 0.0001 to about 5% by weight particulate matter having a diameter of less than about 0.1 microns, preferably less than 0.001 microns. Sub-micron particles are naturally present in any polymeric material and thus will also be present in polymeric materials that are extruded to form fibers for use in the manufacture of textile articles, for example. These particles are generally organic or inorganic materials which are insoluble in the polymeric melt or dope. The term "unfiltered" used herein applies to polymeric materials which, when in a melt phase and during manufacture, are not subjected to the usual micro-filtration procedure to remove impurities, such as non-polymeric inclusions, from the polymeric material.

Additional quantities of a sub-micron particulate matter, such as, for example, fumed silica, calcium oxide and various other inorganic materials such as silicates can also be introduced into the polymeric material. It has been found that the addition of from about 0.0 1 to about 2%, preferably from about 0.1 to about 1% of these sub-micron particles into the polymeric material will reduce the formation of a high degree of order or crystallinity in the spun fiber material. When the polymeric fiber is subsequently stabilized and then carbonized in a non-oxidizing atmosphere to form the BRF, it lacks the stiffness, brittleness and high modulus that is normally associated with a traditional carbon or graphitic fiber, while still exhibiting a low electrical resistivity and good uniform and contiguous surface structure, free from the voids, pores and pitting normally associated with adsorptive carbon materials. These characteristics differentiate the BRFs from high surface area absorptive carbon materials.

The BRFs are essentially continuous, i.e. it can be made to any desired length, they can be essentially linear or nonlinear (i.e. crimped in a conventional manner) and possess a high degree of flexibility which manifests itself in a fiber which is not brittle and which has a much greater ability to withstand shear, and which has a bending strain value of from greater than 0.01 to less than 50%, preferably from about 0.1 to about 30%. These properties allow the BRFs to be bent at sharp angles such as would be required for bipolar electrodes in which the fibers in the electrode assembly are folded upon themselves in order to conserve space within a secondary storage device. In contrast, the bending strain value of a conventional carbon or graphitic fiber with a high modulus is substantially less than 0.01% and often less than 0.001%. Although the BRF of the invention can have a diameter of as large as 30 microns (30 micrometers), it is preferred to form the BRF of a relatively small diameter of from about 1 to about 15 microns, preferably from about 4 to about 8 microns, since the diameter of the fiber is generally proportional to its surface area. Specifically, two fibers of a generally round or circular cross section and having a diameter of 5 microns will present about 4 times the surface area of a single fiber having a diameter of 10 microns.

In the use of the BRFs as an electrode for a secondary energy storage device, the outer carbonized sheath of the BRF typically has a surface area of from greater than 1 to about 150 $m^2/g$, preferably greater than 5 $m^2/g$, and more preferably from about 10 to about 50 $m^2/g$, so long as the method employed to increase the surface area preserves the surface structural integrity of the fiber. The surface area of the non-circular BRF is substantially higher compared to a circular fiber taught in the prior art that generally prefer a surface area that is less than one would associate with activated absorptive carbon (which has a surface area of from greater than 50 and up to 2000 $m^2/g$). Activated absorptive carbon is known to have a very porous and pitted surface and one that is not essentially contiguous, i.e. without pits and pores. The reason for the use of BRFs having a contiguous surface and yet one that has a relatively high surface area lies in the fact that the cross-sectional geometry is changed from the typical generally circular cross-section of the prior art to the hereinbefore described non-circular cross-section which increases the surface area of the fiber for a given diameter while preserving the surface structural integrity characteristics.

With particular reference to FIG. 1, there is illustrated a BRF having a generally circular cross-sectional shape. The fiber is generally identified by reference number 10 and comprises an inner core region 12 of a thermoplastic polymer and an outer region of a carbon or graphite sheath. The fiber has a nominal cross-sectional diameter which is the linear distance from any one point along the outer surface of the fiber through the center of the fiber to an opposite point on its outer surface. Accordingly, the nominal diameter of a circular fiber is also its "effective" diameter.

With reference to FIG. 2, there is illustrated a BRF, generally identified by reference number 20, having a generally tri-lobal cross-sectional shape which presents an enlarged surface area for a given outer nominal fiber diameter, as compared to the circular fiber of FIG. 1. The fiber has an inner core region 22 of a thermoplastic polymer and an outer carbon or graphite sheath represented by the shaded region 24. In the tri-lobal cross-sectional fiber, the outer nominal fiber radius is identified by the arrow Rn pointing to the outermost dotted line 26 encircling the fiber and extending generally tangential along the outer extent of the lobes of the carbon sheath. The effective radius of the fiber is shown by the arrow Re pointing to the dotted line 28 which intersects the valleys of the tri-lobal fiber. The nominal radius of the core is identified by the arrow Cn pointing to the dotted line 30 which generally extends tangentially along the outer extent of the lobes of the core 22. Thus, in the case of a tri-lobal fiber the nominal diameter is equivalent to the nominal diameter of a generally circular cross-sectional fiber, but its effective diameter Re is substantially smaller as represented by the dotted line circle 28. Not only does the smaller effective diameter of the tri-lobal fiber provide the fiber with greater flexibility, but such flexibility is enhanced by the fact that the effective radius of the core is smaller than the nominal radius of the core and, in addition, the fact that the core is of a thermoplastic polymeric material having inherently greater flexibility as compared to a graphitic fiber that is carbonized throughout its entire cross sectional area. The enhanced flexibility of the BRF is represented by a substantially reduced sensitivity of the fiber to shear although, as previously indicated, the shear sensitivity of the biregional fiber is influenced to a major extent by the ratio (r: R) and its bulk density, i.e. the shear sensitivity increases with an increase in the thickness of the outer carbonaceous sheath and its degree of carbon or graphitization. The bending strain value of the biregional fiber is generally less than 30% which is advantageous in forming relatively sharp bends in the fiber without breakage of the fiber. Here again, the bending strain value is further enhanced by the fact that the fiber is non-circular and biregional in construction.

Optionally, the BRF can also be provided with a central passageway extending along the length of the fiber core. A hollow or generally tubular fiber represents a saving in the amount of polymeric material that is used in the spinning of the fiber without any sacrifice in performance. Additionally, the interior passageway renders the fiber even more flexible. It will be understood that a tubular cross section BRF would present concentric regions of a thermoset or carbonaceous outer region and a thermoplastic inner ring core.

The tri-lobal cross-sectional fiber configuration illustrated herein is representative of only one type of cross-sectional configuration and it will be apparent to the artisan that the BRF can be made in any desired cross-sectional shape during its manufacture and that such shape is limited only by limitations of making an extrusion die for extrusion of a polymeric material through the die, the composition of the polymer, temperature, etc. The number of lobes of a fiber is limited only by the fact that the heat softened polymer that is extruded from a die has a tendency to flow and thereby obliterate the cross-sectional shape to revert to a more nearly circular cross-sectional shape. For other cross-sectional shapes of polymeric fibers, reference is made to "Modern Textiles" by D. S. Lyle, particularly pages 52 and 53.

Preferably, the BRFs for use in an electrode of the invention should have the following physical property criteria:

(1) A ratio (r : R) of the radius of the core region (r) with respect to the total radius of the fiber (R) of from about 1:4 to about 1:1.05, preferably from about 1:3 to about 1:1.12.

(2) A breaking twist angle of from about 4 to about 13 degrees.

(3) A bending strain value of from greater than 0.01% to less than 50%, preferably from 0.1 to less than 30%.

(4) A bulk density of from about 1.20 to about 1.32 g/cm³ for the BRPF, preferably from about 1.24 to about 1.28 g/cm³. It should be understood, however, that the density of the fiber is dependent upon the ratio (r:R) of the radius of the core (r) with respect to the diameter of the fiber (R). If, for example, the ratio is 1:1.05 where the oxidized sheath occupies a very small portion of the total cross sectional area of the fiber, the density of the fiber approaches that of a polymeric fiber. In the case where the polymeric fiber is derived from an acrylic polymer, the density is typically from about 1.15 to 1.19 g/cm³ so that the density of the BRPF of the same composition with a ratio of 1:1.05 is slightly higher.

(5) A bulk density of, from about 1.65 g/cm³ to about 1.87 g/cm³, for the electrically conductive BRF-3 and BRF-B, preferably greater than 1.70 g/cm³. Typical densities range from about 1.70 to 1.85 g/cm³ in BRF-3 and up to about 1.87 g/cm³ in BRF-B in which the carbonaceous sheath is graphitic and highly conductive.

Typically, the bulk densities of the BRF-3 or BRF-B can be somewhat higher than indicated above if, for example, the polymeric material that is used for making the BRFs is unfiltered and/or contain a high percentage of an added inorganic particulate material.

(6) A Young's modulus of from less than 1 MM psi (less than 6.9 Gpa and where 1 MM psi is equivalent to 1,000,000 psi), up to about 50 MM psi (345 Gpa), depending on the thickness of the outer stabilized and carbonized sheath regions with the higher number being found with BRF's where the carbonaceous sheath is predominant.

(7) An aspect ratio of greater than 100:1 (the aspect ratio is defined herein as the length to diameter l/d ratio of the BRF), and a fiber diameter of from about 1 to about 30 microns, preferably from 1 to 15 microns, and more preferably from about 4 to 12 microns.

(8) A surface area with respect to BRF of greater than 1 m²/g and up to 150 m²/g, preferably greater than 5 m²/g and, more preferably from about 10 to about 50 m²/g. It will be understood that the lower surface area will not provide the optimum in terms of the storage capacity or coulometric efficiency where the fiber is used for an electrode (9) The carbonized outer sheath of the BRF should have a carbon content of typically greater than 85%, provided that it is sufficiently electrically conductive to serve as an electrode for secondary energy storage devices. Preferably, the carbon content of the outer sheath is greater than 92% and up to about 99% by weight with total carbon content of the BRFs preferably ranging from 70% to 85%. The carbon content of the fiber sheath is somewhat dependent on the type of polymeric material that is used in the extrusion of the fiber. If, for example, the polymeric precursor composition contains as much as 2% of an inert particulate material, the maximum carbon content will be less than 98%.

(10) Specific bulk resistivities for the outer carbonaceous region of the BRFs ranging from less than $10^0$ ohm-cm for fibers that are electrically conductive, to less than $10^{-2}$ ohm-cm for fibers that are highly conductive, i.e. graphitic.

(11) It is preferred that the carbonaceous outer sheath of the BRFs has a contiguous surface that is substantially free of pits and pores and that has micropores representing less than 5% of the total surface area of the fiber.

From the forgoing description, it will be understood that the BRFs can be 1) circular in cross-section, but preferably are non-circular in cross section; 2) the thermoplastic polymeric composition used in the initial extrusion of polymeric fibers for making the BRPFs and the BRFs is preferably selected from a standard acrylic or a sub-acrylic polymer; 3) the acrylic or sub-acrylic polymers can be filtered or unfiltered; and 4) filler materials can be added to the thermoplastic polymer, generally in the form of fine particles.

In accordance with one embodiment of the present invention, and as particularly illustrated in FIG. 3 there is illustrated a secondary battery 10 as described in copending U.S. application Ser. No. 08/280,708. The battery basically comprises a housing 12 having a generally rectangular or prismatic configuration although the housing can have any other desired shape, as described in the aforementioned application. The battery includes a pair of generally planar electrodes 30A and 30B constructed with a multiplicity of BRFs as herein described. The electrodes are positioned in the chamber in a facing relationship. An electrically non-conductive, ion permeable planar sheet like electrode separator 32 is positioned between the electrodes to prevent short circuiting between the electrodes while permitting ions to travel between the electrodes. Although both of the electrodes are preferably made of the flexible BRFs, it is within the scope of the invention to construct the positive electrode, i.e. the cathode, of any other electrically conductive material such as, for example, a metal or metal alloy, provided that the metal is resistant to the corrosive effect of the electrolyte.

The electrodes 30A and 30B are provided on at least one edge (when the electrodes are generally rectangular in shape) with a current or electron collector such as is illustrated, for example in U.S. Pat. No. 4,830,938 to McCullough et al, or as illustrated and described in U.S. Pat. No. 4,631,118, issued on Dec. 23, 1986 to F. P. McCullough et al, the subject matter of both of these patents being incorporated herein in their entirety by reference. Other methods for depositing a current collector on the electrode such as by plasma or vacuum vapor deposition, or the like, can also be employed. In a preferred manner, the current collector 32 extends along at least one edge of each planar electrode 30A and 30B.

As illustrated in FIG. 3, the current collector extends along the top edge of the electrode although it will be apparent that the current collector can also extend along a side or bottom edge of the electrode, at some mid-portion thereof, or along all of the edges of the electrode, to form a frame like configuration. An electrically conductive terminal 36 is connected to the current collector at any suitable position such as, for example at an end or at a midportion of the of the current collector 32. The current collector and at least a portion of the terminal is embedded within the housing wall and to the extent that the electrolyte does not come into contact with the current collector or terminal. Thus, only the carbonaceous fibers of the electrode is exposed to the electrolyte. This design is preferable to the design illustrated in U.S. Pat. No. 4,830,938 to McCullough et al where the current collector is positioned within the electrolyte of the cell and thus must be encapsulated with a polymeric material to protect the current collector from the corrosive effects of the electrolyte.

The electrode of the invention is constructed from a multiplicity of the BRFs that are preferably assembled as a planar sheet, with the fibers oriented in a substantially parallel relationship. The electrode can also made up of a plurality of flexible carbonaceous biregional ribbons; or can be in the form of a film, a sheet, a web, or woven or non-woven fabric, etc. It will be understood that the electrode shape can be changed to any desired configuration, depending only on the desired performance criteria of the electrode. The electrodes can also be in the form of a jelly roll such that the electrodes can be inserted into a cylindrical housing, as disclosed and shown in FIGS. 4, 5 and 7 of U.S. application Ser. No. 08/280,708.

With particular reference to FIG. 3, there is illustrated a bipolar electrical energy storage device comprising a generally rectangular housing 12 which is provided with an internal cell separator wall 50 dividing the chamber into a pair of cells 52A and 52B which form, in effect, a pair of terminal cells. In a more preferred embodiment, a plurality of intermediate cells can be provided between the pair of terminal cells, as illustrated in the single figure of U.S. Pat. No. 4,830,938. The number of cells being limited only by the particular use for which the battery is intended and the desired potential (terminal voltage). The separator wall 50 can be constructed of the same material as the housing wall or of a material, preferably a polymeric material, that can be more impervious to the passage of gas or water vapor than the housing wall itself, requiring only that ions cannot pass therethrough. Each of the terminal cells 52A and 52B contain a terminal electrode 30A and 30B. A bipolar electrode 54, preferably constructed of a unitary planar sheet like structure and formed from a multiplicity of BRFs, is positioned in the housing such that a mid portion 55 thereof is sealingly embedded or potted within a suitable potting resin 56 in the separator wall 50 and such that one portion 54A of the bipolar electrode 54 extends into the terminal cell 52A and another portion 54B of the bipolar electrode extends into the terminal cell 52B. In a preferred embodiment, the bipolar electrode is embedded at a midportion thereof within a wall of the housing itself with the portions 54A and 54B extending from the housing wall into the adjacent terminal cells 52A and 52B. As illustrated, the bipolar electrode exhibits a relatively sharp bend where the mid-portion of the electrode passes through the separator wall 50. A sharp bend in the BRFs being more readily achievable, without breakage of the electrode fibers, in view of the greater flexibility of the fibers as determined by their substantially improved bending strain value, breaking twist angle and elongatability,. It will be understood that only the terminal electrodes of a battery require the presence of a current collector and that the bipolar electrode(s) does not.

Preferably, low ionic resistance, foraminous, ion permeable, electrically non-conductive separators 32A and 32B are positioned between each terminal electrode 30A and 30B and the portions 54A and 54B of the bipolar electrode 54 extending into each terminal cell to prevent electrical contact and short circuiting between the electrodes. The separator is generally in the form of a membrane or sheet of a polymeric material, glass fibers, and the like, as disclosed in U.S. Pat. No. 4,865,931 to McCullough et al.

The electrodes of the invention can also be readily adapted to other battery systems, particularly lithium ion cells which have been developed in recent years, as more fully disclosed and illustrated in FIGS. 5, 5A and 5B of U.S. Pat. No. 5,518,836 and copending U.S. application Ser. No. 08/280,708. Basically, a lithium ion battery is similar in construction to the battery illustrated in FIG. 3, except that one of the terminal electrodes consist of an electrically conductive collector frame having a lithium salt of a metal oxide coating (in the fully discharged state) and a pseudo bipolar composite electrode having a portion of the carbon fibers coated with a metal oxide coating.

Using the continuous flexible BRFs also provides for a greater freedom of making the electrode into a variety of different shaped configurations, while lowering the internal resistance of the electrode by several orders of magnitude.

In a lithium ion cell, one of the terminal electrodes 66 can consist of a multiplicity of BRFs which is positioned in terminal cell 64B. A bipolar electrode consisting of a multiplicity of BRFs, as herein before described, is provided over a portion of the BRFs with a coating 56 of a lithium salt of a metal oxide of the empirical formula $Li(MO2)n$ in which M is a metal selected from the group consisting of VIIb and VIIIb, thus forming the pseudo bipolar electrode of the invention. Preferably, the metals are selected from the group consisting of Co, Ni and Mn, where n=1 for Co and Ni and n=2 for Mn. Here again, the metal oxide coating is preferably selected from the group consisting of $CoO2$; $NiO2$ and $Mn2O4$. In the usual manner, each of the terminal electrodes is separated from its counter electrode by an electrically non-conductive, ion permeable planar, sheet like electrode separator, the edge of each terminal electrode is provided with a current collector and a terminal, and the cells are provided with a non aqueous organic electrolyte.

The invention will now be described with the aid of the following examples:

EXAMPLE 1

A 40 k (40,000 individual fibers) tow of acrylic fibers made from a composition of approximately 94% acrylonitrile, 4% methacrylate and at least 0.01% of submicron impurities, which are not removed by microfiltration, is made by the traditional wet spinning technique. The sub acrylic composition fibers have an average diameter of 11 microns. The fiber tow is oxidation stabilized in air while under tension at a temperature of 224° C. for 20 minutes. The density of the so formed biregional precursor fibers (BRPFs) is 1.25 $g/cm^3$. The BRPFs are cut and analyzed under a polarized light microscope. The individual fibers show a distinct color change from the non-oxidized core to the oxidized outer sheath, when viewed in cross section, but do not show a boundary or discontinuity between the sheath and the core. The ratio of the radius of the core to the radius of the fiber is measured and determined to be 1:1.29

The BRPFs are then texturized in a dynamic air stream and heat treated at a temperature of 550° C. in a tube furnace under a purged $O_2$ free $N_2$ atmosphere for 1.5 minutes while in a relaxed and unstressed condition. The resulting biregional fibers (BRFs) have an aspect ratio of greater than 10,000:1 and a nominal fiber diameter of 9.5 microns. The fibers are flexible and have a breaking twist angle of 8.5 degrees. Additional physical characteristics of the BRFs show a bending strain value of 0.1%, a density of 1.54 $g/cm^3$, a Young's modulus of 1 MM psi, a surface area of 3 $m^2/g$, and a bulk resistivity of $10^3$ ohm-cm.

EXAMPLE 2

Several samples of a 6 k tow of fibers having a diameter of from 12 to 13 microns and of the same composition as in Example 1 were oxidation stabilized and then analyzed for density and ratio (r:R) of the core to the fiber. The analytical results of the tests are set forth in the table below:

TABLE II

| Sample | Time (min) | Temp (deg C.) | Density (g/cm³) | r:R; r = 1 and R = | Volume % core | Volume % sheath |
|---|---|---|---|---|---|---|
| A | 100 | 194 | 1.264 | 6.25 | 2.6 | 97.4 |
| B | 10 | 196 | 1.206 | 1.13 | 79.0 | 21.0 |
| C | 20 | 224 | 1.218 | 1.29 | 60.5 | 39.5 |
| D | 30 | 224 | 1.245 | 1.40 | 51.0 | 49.0 |

From the Table above, it can be seen that the density and the degree of oxidation of the fiber increases with residence time. In sample A, the volume percentage for the core was not sufficient to effectively distinguish the fiber from fully oxidized fibers. At a ratio of 1:6.25, the core represents only about 2.6% by volume of the total volume of the fiber which is insufficient to impart to the fiber the desired BRPF characteristics. At a ratio of 1:4, the percent volume for the core increases to about 51% with a corresponding decrease in the density of the fiber. From the data in the table, it can also be deduced that an increase in residence time and temperature results in an increase in density. Samples B, C and D, on visual inspection, clearly showed a difference in texture and color between the cores and the black oxidized outer sheath, but did not show any boundary or discontinuity between the sheath and the core.

EXAMPLE 3

A tow of sub-acrylic fibers comprising 83% acrylonitrile, 14% vinyl chloride and 3% itaconic acid units is made by the traditional melt spinning technique and have a trilobal cross-section as shown in FIG. 2. The fibers are stretched during extrusion to attenuate the fibers and are then oxidatively stabilized in accordance with the procedure set forth in Example 1. The stabilized fibers are carbonized at a temperature of 950° C. in a tube furnace under a purged $O_2$ free $N_2$ atmosphere for 1.5 minutes. The resulting fibers have a nominal fiber diameter of 8.0 microns, an effective fiber diameter of 4 microns, and an aspect ratio of greater than 10,000:1. The fibers have a breaking twist angle of 8.5 degree, are flexible and have a bending strain value of 0.2%, a surface area of 11 m²/g, a density of 1.7 g/cm, a Young's modulus of 4 MM psi, and a bulk resistivity 0.085 ohm-cm. The ratio of the radius of the core to the radius of the fiber is measured and determined to be 1:1.5. The BRFs are suitable for use in electrodes for secondary energy storage devices.

EXAMPLE 4

The LOI values for various materials was determined and compared to the BRPF and BRF. The results are set forth below:

| MATERIALS | LOI VALUES |
|---|---|
| Polypropylene | 17.4 |
| Polyethylene | 17.4 |
| Polystyrene | 18.1 |
| Rayon | 18.6 |
| Cotton | 20.1 |
| Nylon | 20.0 |
| Polycarbonate | 22 |
| Rigid Polyvinyl Chloride | 40 |
| BRPF | 40–44 |
| BRF | 40–55 |
| Graphite | 55 |

EXAMPLE 5

The non-flammability of the BRFs is determined following the test procedure set forth in 14 CFR 25.853(b), which is incorporated herewith by reference. The test is performed as follows:

A minimum of three 1"×6"×6" (2.54 cm ×15.24 cm×15.24 cm) specimens (derived from a batting of the BRFs of Example 3 are prepared. The specimens are conditioned by maintaining them in a conditioning room maintained at a temperature of 70° C.±3° and 5% relative humidity for 24 hours preceding the test.

Each specimen is supported vertically and exposed to a Bunsen or Turill burner with a nominal I.D. tube of 1.5 inches (3.8 cm) in height. The minimum flame temperature is measured by a calibrated thermocouple pyrometer in the center of the flame and is 1550° F. The lower edge of the specimen is 0.75 inch (1.91 cm) above the top edge of the burner. The flame is applied to the cluster line of the lower edge of the specimens for 12 seconds and then removed.

Pursuant to the test, the material is self-extinguishing. The average burn length does not exceed 8 in. (20.32 cm), the average after flame does not exceed 15 seconds and flaming drippings did not continue to burn for more than 5 seconds after falling to the burn test cabinet floor.

EXAMPLE 6

A) In accordance with the general procedure described in Example 1 of Pat. No. 5,518,836, a 320 k tow of acrylic fibers containing approximately 86% acrylonitrile, 13% methacrylate and at least 0.01% of sub-micron impurities, which are not removed by micro-filtration, is extruded by the traditional melt spinning technique using a forming die. The tow of acrylic fibers is stretched during extrusion of the fibers to attenuate the fibers and then oxidized in air for 25 min. in an oven in which the temperature is gradually increased from 250° C. to 300° C. The resulting BRPF precursor fibers are biregional and have an inner core of a thermoplastic polymer and an oxidation stabilized outer sheath and have a breaking twist angle of 19 degrees. From polarized light photomicrographs, the two regions are visually distinguishable from each other but do not show a boundary or discontinuity between the region .

B) The BRPFs of A) are placed in a tube furnace and treated at a temperature of 1000° C. under a purged $O_2$ free $N_2$ atmosphere for 1.0 minutes. The resulting BRF's have a nominal fiber diameter of 6.8 microns, an effective fiber diameter of 4.2 microns and an aspect ratio of greater than 10,000:1. The BRFs are flexible and have a breaking twist angle of 8 degrees, a bending strain value of 0.1%, a Young's modulus of 950,000 psi, a surface area of 14 m²/g, and a bulk resistivity of 0.035 ohm-cm. The ratio of the radius of the core to the radius of the fiber is measured and determined to be 1:1.9 These fibers are useful as an electrode material for secondary energy storage devices and as the conductive component for very light weight, thin, flexible measurement electrodes for a portable EKG monitor.

C) The BRFs of 6 B) are placed in a high temperature tube furnace and treated at a temperature of 1750° C. under a purged $O_2$ free $N_2$ atmosphere for 1.2 minutes. The resulting BRFs are graphitized and have a nominal fiber diameter of 6.4 microns, an effective fiber diameter of 4.0 microns and an aspect ratio of greater than 10,000:1. The fibers are flexible and have a breaking twist angle of 4.5 degrees, a bending strain value of 0.1%, a Young's modulus of 10 MM psi, a surface area of 12 m²/g, and a bulk resistivity of 0.0035 ohm-cm. The ratio of the radius of the core to the radius of the fiber is measured and determined to be 1:2. These fibers are useful as an electrode for secondary batteries and as the conductive component for very light weight, thin, flexible measurement electrodes for a portable EKG monitor.

EXAMPLE 7

Two secondary battery cells were constructed using the BRFs produced in examples B and 6C, respectively, and similar in construction to that shown in FIG. 1 of U.S. Pat. No. 5,518,836. The electrodes of each cell are in the shape of thin planar sheets made from the fiber tows and have a dimension of 4 in$^2$(25 cm$^2$). A thin copper collector strip is attached to one edge of the planar electrode sheet with a terminal connector attached to one end of the collector strip. The collector strip is covered with a non-conductive DERA-KANE® resin coating. A thin 200 micrometer non-woven polypropylene scrim is also fabricated and positioned between the electrode sheets for use as a separator material. An electrolyte comprising 20% LiClO$_4$ in propylene carbonate is dried to less than 5 ppm H$_2$O using highly activated 5A molecular sieves. The electrodes and separator are dried and assembled in a dry box containing less than 1 ppm moisture. This assembly is placed in a non-electrically conductive plastic lined aluminum case. The case is filled with the dry electrolyte and 1.5 g of highly activated 5A molecular sieves. The case is then sealed with the terminals of each electrode potted in a resin seal and protruding through the top of the case lid. The completed assembly is then removed from the dry box and tested as a battery cell. The cell is electrically charged at potentials of 4.75 to 5.0 volts and discharged to 90% of its charge capacity. The capacity of each cell is approximately 300–600 coulombs per gram of carbon and each cell has a coulombic efficiency of greater than 98%. The cell is capable of over 1000 cycles without loss of capacity or efficiency.

EXAMPLE 8

Two bipolar, two cell, batteries are constructed as shown in FIG. 3. using the two different flexible BRFs prepared in examples 6B and 6C. The electrolyte and housing material having two compartments are the same as used in Example 7. The total thickness across each bipolar battery is approximately 1 cm. The bipolar electrode, being twice the size of each of the respective terminal electrodes, is passed through the cell wall connecting the two cells and potted in a DERAKANE® resin. This cell is charged and discharged repeatedly. Charging is done at a potential of 9.5 to 10 volts. Open circuit voltage on full charge is greater than 9 volts. The coulombic efficiency is 98%.

EXAMPLE 9

A secondary lithium ion battery, containing two terminal cells with one pseudo bipolar connecting electrode is constructed in accordance with the procedure described in Example 5 of U.S. Pat. No. 5,518,836, using the BRFs produced in example 5C. The battery is similar in construction to the rectangular battery shown in FIG. 5. The electrodes of each cell consist of thin planar sheets of BRFs and have a dimension of 4 in$^2$ (25 cm$^2$). A thin copper busbar, forming an electron collector strip, is applied to the fiber ends along one edge of the electrode. A terminal connector is attached, by soldering to one end of the collector strip. The collector strip is potted into the top of the cell wall which is comprised of a non-conductive DERAKANE® resin coating. A very thin coating of copper is also plated onto one half portion of the pseudo bipolar electrode to which a coating of LiCoO$_2$ active material is applied as illustrated in FIG. 5A of the U.S. Patent. A non-woven polypropylene scrim having a thickness of 180 to 200 micrometer is positioned between the electrode sheets for use as a separator sheet. An electrolyte comprising 10% LiPF$_6$ in propylene carbonate is dried to less than 5 ppm H$_2$O using highly activated zeolite molecular sieves. This assembly is placed into a housing of PVC which is provided on the outer surface with an aluminum foil having a thickness of 50 microns. The housing is filled with the dried electrolyte and 1.5 g of highly activated zeolite molecular sieves. The housing is then sealed with the collector strips and terminals of each electrode potted in a Derakane™ brand vinyl ester resin seal and protruding through the top of the housing lid. The completed assembly is then tested as a battery cell. The cell is electrically charged, then discharged to 80% of its charge capacity. The average working voltage of the cell is 3.75V. The capacity of each cell is greater than 550 coulombs per gram of carbon electrode (excluding carbon used as collector frame material in the metal oxide electrode) and each cell has a coulombic efficiency of greater than 98%.

What is claimed is:

1. An electrode for a secondary energy storage device, comprising a multiplicity of electrically conductive biregional fibers, each said biregional fiber having an inner region of a thermoplastic polymeric core and an outer region of a carbonaceous sheath.

2. The electrode of claim 1, wherein said biregional fiber has a breaking twist angle of from about 4 to about 13 degrees.

3. The electrode of claim 1, wherein the ratio (r:R) of the radius of the inner core region (r) of the biregional fiber with respect to the total radius of the fiber (R) is from about 1:4 to about 1:1.105.

4. The electrode of claim 1, wherein the ratio (r:R) of the radius of the inner core region (r) of the biregional fiber with respect to the total radius of the fiber (R) is from about 1:3 to about 1:1.125.

5. The electrode of claim 1, wherein said biregional fiber has a Young's Modulus of from less than 1 MM to about 30 MM psi and a bending strain value of greater than 0.01% but less than 50%.

6. The electrode of claim 1, wherein said biregional fiber has a density of from about 1.65 to about 1.87 g/cm$^3$, a Young's Modulus of from about less than 1 MM psi to about 30 MM psi, and a bending strain value of greater than 0.1% but less than 30%.

7. The electrode of claim 1, wherein said carbonized outer sheath region of the fiber is electrically conductive, and wherein said fiber has a total carbon content of less than 85% by weight, and a bulk resistivity of less than about 10$^1$ ohm-cm.

8. The electrode of claim 1, wherein said carbonized outer sheath region is electrically conductive, has a total carbon content of from 68% to 96% by weight, a bulk resistivity of less than about 10$^1$ ohm-cm.

9. The electrode of claim 1, wherein said biregional fiber has a generally circular, non-circular, or tubular cross-sectional shape and a diameter of from about 1 to about 30 micrometers.

10. The electrode of claim 1, wherein said biregional fiber is ignition resistant and has an LOI of greater than 40.

11. The electrode of claim 1, wherein said inner thermoplastic core region and said surrounding outer carbonaceous sheath region are continuous and do not present an intermediate boundary or discontinuity between the regions.

12. The electrode of claim 1, wherein said biregional fiber is derived from a biregional precursor fiber, said precursor fiber having an inner region of a thermoplastic polymeric core and a surrounding outer region of a stabilized sheath, and wherein said inner thermoplastic core region and said outer stabilized sheath region are continuous and do not present an intermediate boundary or discontinuity between the regions.

13. The electrode of claim 11, wherein said biregional precursor fiber is derived from a single homogeneous thermoplastic polymeric composition.

14. The electrode of claim 13, wherein said polymeric composition comprises an acrylic polymer selected from the group consisting of copolymers and terpolymers of acrylonitrile, wherein said copolymers and terpolymers contain at least 85 mole percent acrylic units and up to 15 mole percent of one or more vinyl monomers copolymerized therewith.

15. The electrode of claim 14, wherein said vinyl monomers copolymerizable with acrylonitrile include methacrylic acid esters and acrylic acid esters such as methyl methacrylate, ethyl methacrylate, propyl methacrylate, butyl methacrylate, methyl acrylate and ethyl acrylate; vinyl esters such as vinyl acetate and vinyl propionate; acrylic acid, methacrylic acid, maleic acid, itaconic acid and the salts thereof; vinylsulfonic acid and the salts thereof.

16. The electrode of claim 11, wherein said polymeric composition is an acrylic resin selected from the group consisting of copolymers and terpolymers of acrylonitrile, wherein said copolymers and terpolymers contain less than 85 mole percent acrylic units and more than 15 mole percent of one or more plasticizer polymers copolymerized therewith.

17. The electrode of claim 16, wherein said copolymers and terpolymers contain up to 35 mole percent of one or more plasticizer polymers.

18. The electrode of claim 17, wherein said plasticizer polymer is selected from the group consisting of vinyl chloride, methyl acrylate, methyl methacrylate, polyvinyl chloride, cellulose esters, phthalates, adipates, and sebacate esters, polyols such as ethylene glycol and its derivatives, tricresyl phosphate, caster oil, and mixtures thereof.

19. The electrode of claim 11, wherein said polymeric composition comprises an unfiltered acrylic polymer containing from about 0.0001 to about 5% by weight particulate matter having a diameter of less than about 0.1 microns.

* * * * *